(12) United States Patent
Yoon

(10) Patent No.: US 8,659,831 B2
(45) Date of Patent: Feb. 25, 2014

(54) OPTICAL SYSTEM

(75) Inventor: Youngshik Yoon, Los Angeles, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 366 days.

(21) Appl. No.: 12/735,307

(22) PCT Filed: Jan. 8, 2008

(86) PCT No.: PCT/US2008/000222
§ 371 (c)(1),
(2), (4) Date: Jul. 1, 2010

(87) PCT Pub. No.: WO2009/088386
PCT Pub. Date: Jul. 16, 2009

(65) Prior Publication Data
US 2010/0284069 A1   Nov. 11, 2010

(51) Int. Cl.
G02B 27/22 (2006.01)
G03B 25/02 (2006.01)

(52) U.S. Cl.
USPC .............. 359/463; 359/464; 359/462; 40/454

(58) Field of Classification Search
USPC ...................... 359/462, 463, 465; 40/430, 454
See application file for complete search history.

(56) References Cited

U.S. PATENT DOCUMENTS

| | | | | |
|---|---|---|---|---|
| 4,588,259 A | * | 5/1986 | Sheiman | 359/465 |
| 4,870,768 A | * | 10/1989 | Watt et al. | 40/430 |
| 5,012,351 A | * | 4/1991 | Isono et al. | 386/338 |
| 5,408,295 A | | 4/1995 | Hahm et al. | |
| 5,629,070 A | | 5/1997 | Korth | |
| 6,176,582 B1 | | 1/2001 | Grasnick | |
| 6,226,109 B1 | | 5/2001 | Tompkin et al. | |
| 6,775,839 B1 | | 8/2004 | O'Brien | |
| 6,833,960 B1 | | 12/2004 | Scarbrough et al. | |
| 2004/0076310 A1 | | 4/2004 | Hersch et al. | |
| 2004/0136293 A1 | | 7/2004 | Matos | |
| 2006/0072444 A1 | | 4/2006 | Engel et al. | |
| 2006/0280331 A1 | | 12/2006 | Chosson et al. | |
| 2007/0170257 A1 | | 7/2007 | Haraszti | |

FOREIGN PATENT DOCUMENTS

WO   WO9812703   3/1998
WO   WO2006095049   9/2006

* cited by examiner

*Primary Examiner* — Audrey Y Chang
(74) *Attorney, Agent, or Firm* — Robert D. Shedd; Richard LaPeruta

(57) ABSTRACT

An optical system comprising a circular image strip comprising an inner image strip, an outer image strip, and an effective zone, and a circular lenticule configured to direct light reflected from the inner image strip to a first eye of a viewer and to direct light reflected from the outer image strip to a second eye of a viewer when the viewer views an effective zone of the circular image strip is disclosed.

10 Claims, 4 Drawing Sheets

OPTICAL SYSTEM

This application claims the benefit, under 35 U.S.C. §365 of International Application PCT/US2008/000222, filed Jan. 8, 2008, which was published in accordance with PCT Article 21(2) on Jul. 16, 2009 in English.

FIELD OF THE INVENTION

The present invention is related to the field of optical systems.

BACKGROUND OF THE INVENTION

While conventional lenticular display systems are capable of delivering a variety of optical effects, perception of the effects require that a viewer view the conventional lenticular display system from a predefined angle with respect to the length of the linear lenticules. For example, when a conventional lenticular display system is designed to provide a depth or 3D effect, a viewer is optimally oriented so that the lengths of the lenticules run generally vertically (up/down) within the viewer's field of view. A problem with the conventional lenticular display system described above is that the desired depth or 3D effects are generally unsuccessful when the lenticules are oriented with an angular offset of 90° from the optimal viewing orientation because the viewer's eyes are horizontally spaced. In fact, with some conventional lenticular display systems, only a slight angular offset from the optimal viewing orientation results in a significant degradation of the intended depth or 3D effect.

SUMMARY OF THE INVENTION

The present invention relates to an optical system comprising a circular image strip comprising an inner image strip, an outer image strip, and an effective zone, and a circular lenticule configured to direct light reflected from the inner image strip to a first eye of a viewer and to direct light reflected from the outer image strip to a second eye of a viewer when the viewer views an effective zone of the circular image strip.

DETAILED DESCRIPTION OF THE INVENTION

Figure 1:
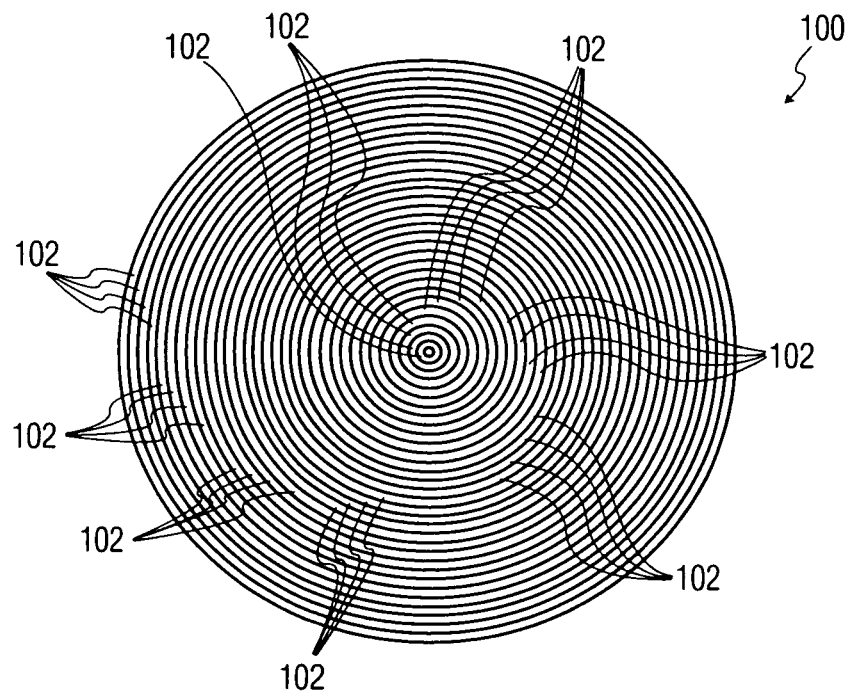
FIG. 1 is an orthogonal view of a circular lenticular sheet according to an embodiment of the present invention.

A circular lenticular sheet 100 according to a first embodiment of the present invention is illustrated in FIG. 1. Circular lenticular sheet 100 comprises a plurality of substantially concentric and adjacent circular lenticules 102. Each circular lenticule 102 generally comprises an upper convex surface. The lenticules 102 are substantially transparent and may be constructed of plastic, glass, or any other material suitable for light transmission. A circular lenticular density is the number of lenticules 102 per unit of length l along a radius r, where the radius extends radially from a center C. Center C is generally located at the center of the concentric lenticules 102. The circular lenticular profile may be increased or decreased as a matter of design to accommodate larger or smaller optimal viewing distances, respectively. Further, while the lenticules 102 are formed integrally as a circular lenticular sheet 100, alternative embodiments of the present invention may incorporated individual stand alone lenticules 102 which are not joined together but that may be arranged concentrically and adjacent one another.

Figure 2:
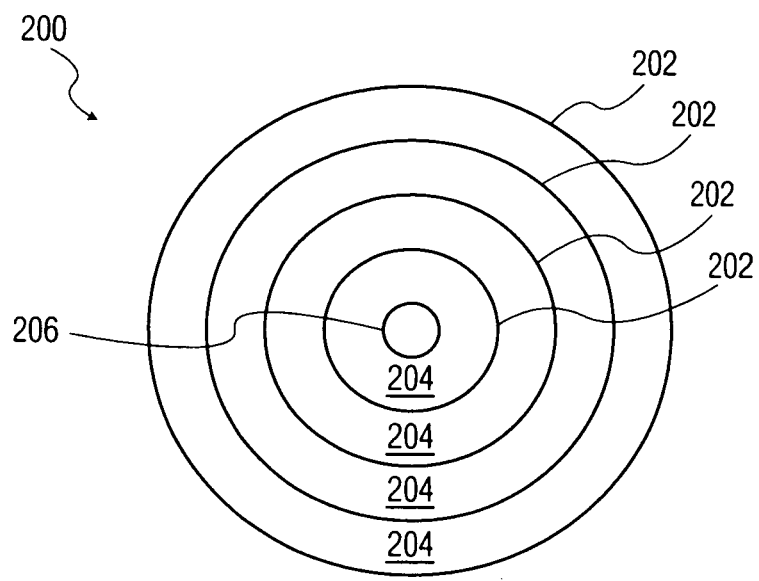
FIG. 2 is an exaggerated orthogonal view of a circular lenticular sheet according to another embodiment of the present invention.

Referring now to FIG. 2, a circular lenticular sheet 200 for a digital disc is illustrated. In this view, the circular lenticular density is illustrated as being very low to enable a clearer discussion of the embodiment. Accordingly, there are few individual lenticules 202 having upper convex surfaces 204 illustrated. The circular lenticular sheet 200 is substantially similar to circular lenticular sheet 100. However, a spindle hole 206 is provided at the center of the circular lenticular sheet 200 to allow passage of a digital disc drive spindle (not shown) therethrough.

Figure 3:
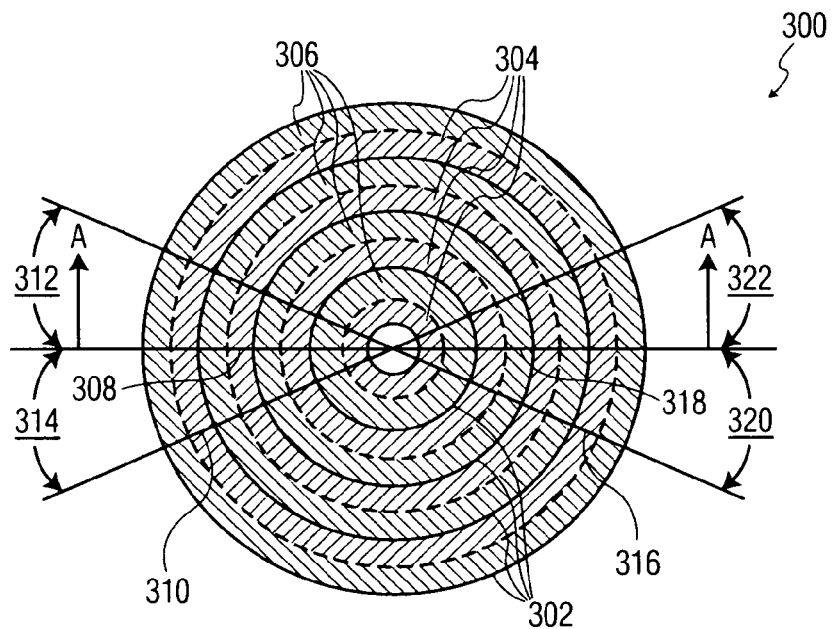
FIG. 3 is a schematic diagram of a circular interlaced image according to an embodiment of the present invention.

Referring now to FIG. 3, a circular interlaced image 300 is configured for use with circular lenticular sheet 200 so that the substantially transparent circular lenticular sheet 200 can be located on top of circular interlaced image 300. When assembled together, circular lenticular sheet and circular lenticular image 300 are generally coaxial with their centers being aligned. Circular interlaced image 300 comprises a plurality of substantially concentric and adjacent circular image strips 302. Each circular image strip 302 comprises an inner strip 304 and an outer strip 306. Images formed by the inner strips 304, collectively, are configured to convey a first of two necessary images for producing a depth or 3D effect. The images formed by the outer strips 306, collectively, are configured to convey a second of the two necessary images for depth or 3D viewing. When image circular interlaced image 300 is viewed through the circular lenticular sheets 200, the pupillary distance of the viewer's human optical system causes a viewer's left and right eyes to perceive the circular interlaced image 300 differently.

More specifically, when a left half of the circular interlaced image 300 is viewed from above and through the circular lenticular sheet 200, the viewer's left eye receives light reflected from the outer strips 306 while the viewer's right eye receives light reflected from inner strips 304. This differentiated perception between the viewer's left and right eyes occurs with adequate differentiation to cause a viewer to perceive an image having depth or a 3D image within a left effective zone 308. The left effective zone 308 is generally an angularly swept area including both a radial sweep extending from a leftward extending radius 310 in a clockwise direction by a left clockwise offset angle 312 a radial sweep extending from the leftward extending radius 310 in a counterclockwise direction by a left counterclockwise offset angle 314. Generally, the left effective zone 308 is a portion of the circular lenticular sheet 200 and circular interlaced image 300 where, despite the curvature of the individual lenticules 202 and image strips 302, a viewer's human optical system perceives the portion as being oriented sufficiently vertical within the viewer's field of view to allow the differentiated perception of the inner strips 304 and outer strips 306 as described above.

In much the same way, when a right half of the circular interlaced image 300 is viewed from above and through the circular lenticular sheet 200, the viewer's left eye receives light reflected from the inner strips 304 while the viewer's right eye receives light reflected from outer strips 306. This differentiated perception between the viewer's left and right eyes occurs with adequate differentiation to cause a viewer to perceive an image having depth or a 3D image within a right effective zone 316. The right effective zone 316 is generally an angularly swept area including both a radial sweep extending from a rightward extending radius 318 in a clockwise direction by a right clockwise angular offset 320 and a radial sweep extending from the rightward extending radius 318 in a counterclockwise direction by a right counterclockwise angular offset 322. Generally, the right effective zone 316 is a portion of the circular lenticular sheet 200 and circular interlaced image 300 where, despite the curvature of the individual lenticules 202 and image strips 302, a viewer's human optical system perceives the portion as being oriented sufficiently vertical within the viewer's field of view to allow the differentiated perception of the inner strips 304 and outer strips 306 as described above.

Figure 4:
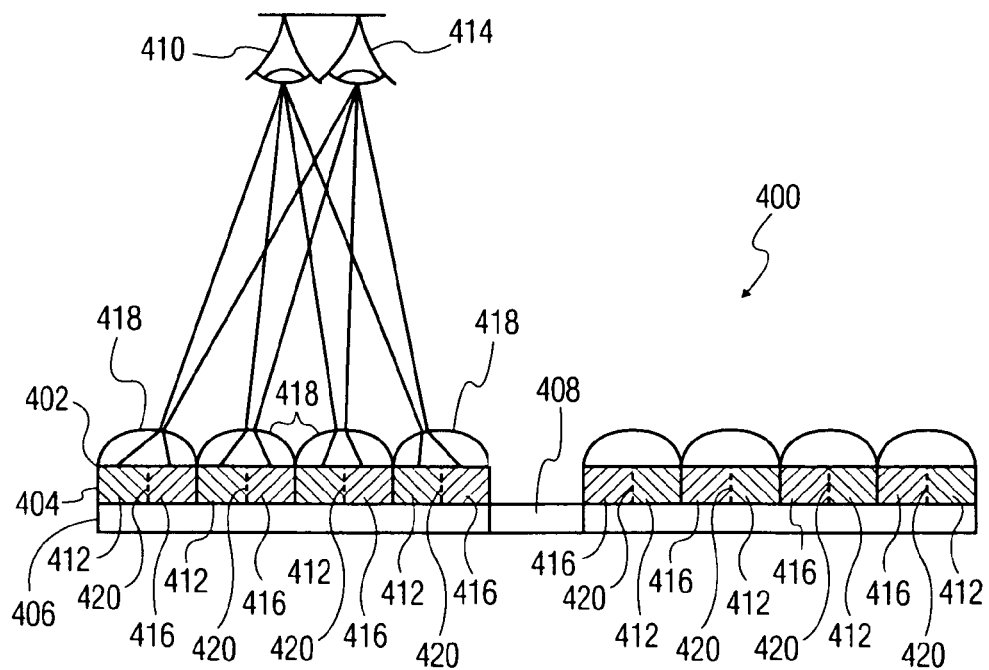
FIG. 4 is simplified cross-sectional view of a digital disc having a circular lenticular optical system according to the present invention.

Referring now to FIG. 4, a simplified cross-sectional view of a digital disc having a circular lenticular optical system of the present invention applied thereto is shown. Specifically a circular lenticular optical system 400 comprising a circular lenticular sheet 402 and a circular interlaced image 404 is shown. Circular lenticular sheet 402 is substantially similar to circular lenticular sheet 200 and circular interlaced image 404 is substantially similar to circular interlaced image 300. Circular interlaced image 404 is applied to a digital disc 406 comprising a spindle hole 408. FIG. 4 further shows how a viewer's left eye 410 receives light reflected from outer strips 412 substantially similar to outer strips 306 while a viewer's right eye 414 receives light reflected from inner strips 416 substantially similar to inner strips 304. It is clear that each lenticule 418 (substantially similar to lenticules 202) is associated with a circular image strip 420 (substantially similar to circular image strips 302) located between the lenticules 418 and the digital disc 406. While circular lenticular sheet 402 and circular interlaced image 404 are shown as being separate components of circular lenticular optical system 400, it will be appreciated that the two may be combined into a single component. More specifically, in alternative embodiments of the present invention, the circular interlaced image 404 may be applied directly to or otherwise incorporated into a lower side of the circular lenticular sheet 402. Further, it will be appreciated that the circular interlaced image 404 may be embedded within the digital disc 406 in the form of an interlaced print or inscription (such as diffractive gratings), allowing placement of the circular lenticular sheet 402 directly onto the digital disc 406.

Figure 5:
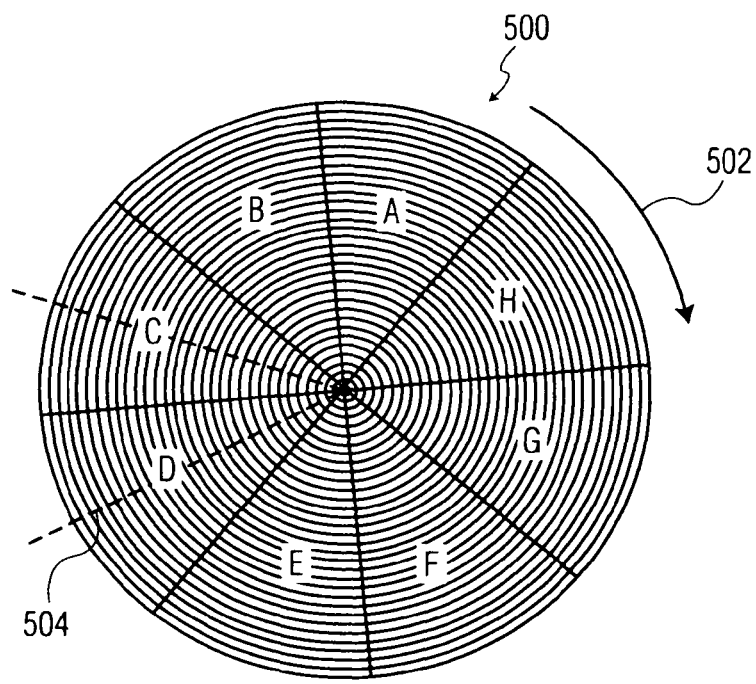
FIG. 5 is a schematic diagram of a circular interlaced image according to another embodiment of the present invention.

Referring now to FIG. 5, circular interlaced image 500 comprises a plurality discrete angular image frames: A, B, C, D, E, F, G, and H. Circular interlaced image 500 is well suited for application to a digital disc substantially similar to digital disc 406. Further, the angular image frames A-H are designed to carry progressive image data much like the frames of a video sequence such that successive viewing of the angular image frames A-H result in a perceived animation or morphing of the perceived depth or 3D image. For example, where circular interlaced image 500 is rotated about its center in the clockwise direction denoted by arrow 502 and is viewed by a viewer (not shown) concentrating his focus on a left effective zone 504 (substantially similar to left effective zone 308), the viewer would perceive the depth or 3D images carried by the angular image frame D while the angular image frame D is located within the left effective zone 504, followed by angular image frames E, F, G, H, H, B, and C as they successively are located within the left effective zone 504.

Figure 6:
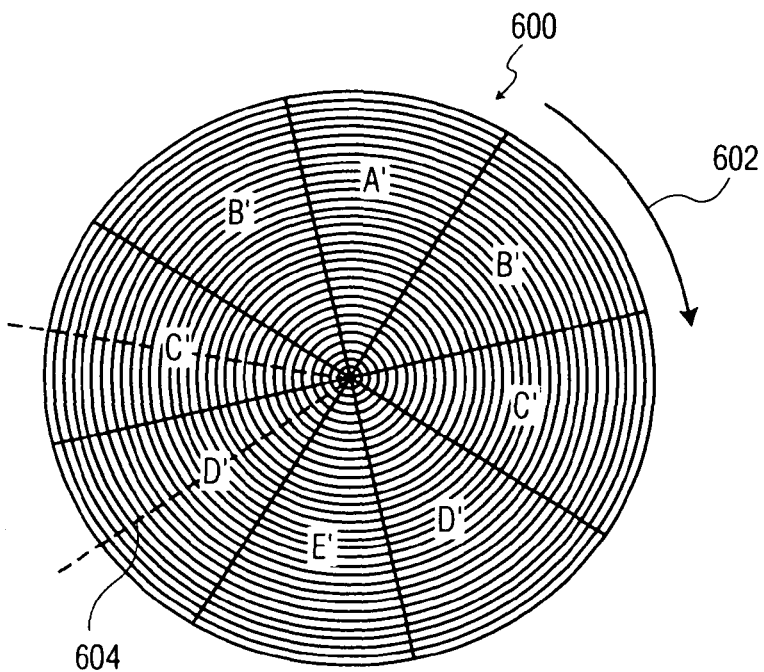
FIG. 6 is a schematic diagram of a circular interlaced image according to another embodiment of the present invention.

Referring now to FIG. 6, circular interlaced image 600 comprises a plurality discrete angular image frames: A', B', C', D', and E'. Circular interlaced image 600 is well suited for application to a digital disc substantially similar to digital disc 406. Further, the angular image frames A'-E' are designed to carry progressive image data much like the frames of a video sequence such that successive viewing of the angular image frames A'-E' result in a perceived alternating animation or morphing of the perceived depth or 3D image. For example, where circular interlaced image 600 is rotated about its center in the clockwise direction denoted by arrow 602 and is viewed by a viewer (not shown) concentrating his focus on a left effective zone 604 (substantially similar to left effective zone 308), the viewer eventually perceive the depth or 3D images carried by the angular image frame A' while the angular image frame A' is located within the left effective zone 604, followed by angular image frames B', C', D', E', D', C', B', and ultimately A' again as they successively are located within the left effective zone 604. The manner in which angular image frames B', C', and D' are displayed in alternating orders between the display of angular image frames A' and E' allow for an alternating animation or morphing of the perceived depth or 3D image. Of course, circular interlaced images 500 and 600 are only two of many possible sequences by which depth or 3D images may be display to a viewer in an animated, morphing, or flipping manner.

Figure 7:
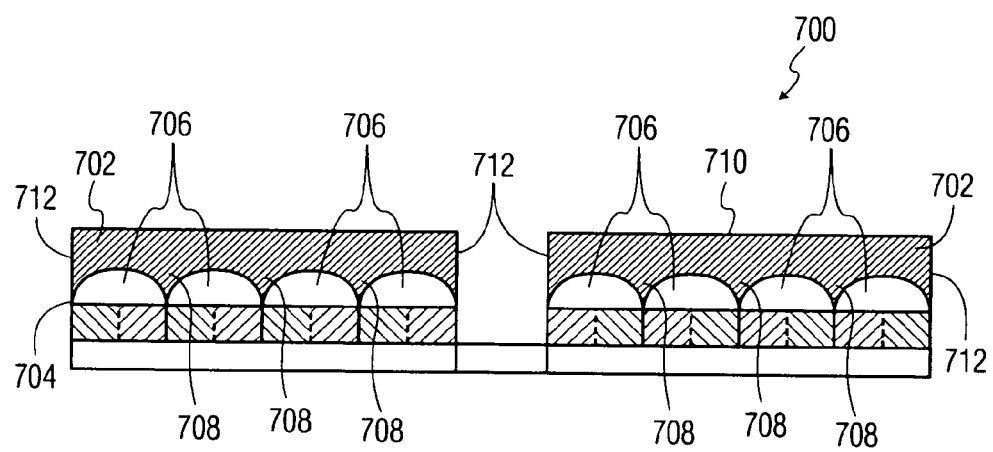
FIG. 7 is a simplified cross-sectional view of a digital disc having a circular lenticular optical system according to another embodiment of the present invention.

Referring now to FIG. 7, circular lenticular optical system 700 (substantially similar to circular lenticular optical system 400) is illustrated. A primary difference between circular lenticular optical system 700 and circular lenticular optical system 400 is that a raised concealing layer 702 is applied to the circular lenticular sheet 704. Raised concealing layer 702 covers the lenticules 706 of the circular lenticular sheet 704 by filling spaces 708 between the lenticules 706 and providing a raised and substantially planar top surface 710 above the lenticules 706. The raised concealing layer 702 also serves to provide substantially vertical sidewalls 712 that conceal the outer edges of the outermost and innermost lenticules 706. The raised concealing layer 702 serves to both protect the lenticules 706 from damage and to make inspection and detection of the presence of the circular lenticular sheet 704 (and its lenticules 706) more difficult. By concealing the circular lenticular sheet 704 (and its lenticules 706) the circular lenticular optical system 700 is more difficult to reverse engineer.

Figure 8:
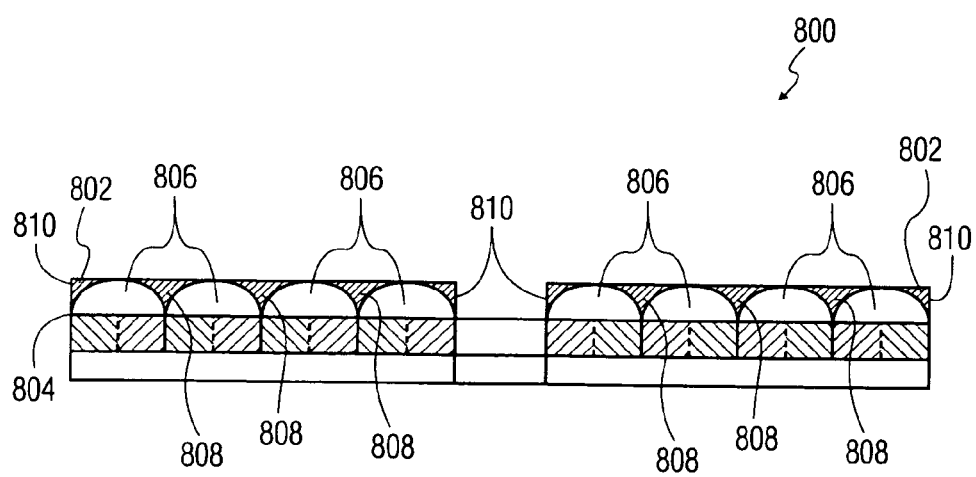
FIG. 8 is a simplified cross-sectional view of a digital disc having a circular lenticular optical system according to another embodiment of the present invention.

Referring now to FIG. 8, circular lenticular optical system 800 (substantially similar to circular lenticular optical system 400) is illustrated. A primary difference between circular lenticular optical system 800 and circular lenticular optical system 400 is that a coplanar concealing layer 802 is applied to the circular lenticular sheet 804. Coplanar concealing layer 802 fills spaces 808 between the lenticules 806 and provides substantially vertical sidewalls 810 that conceal the outer edges of the outermost and innermost lenticules 806. The coplanar concealing layer 802 serves to both protect the lenticules 806 from damage and to make inspection and detection of the presence of the circular lenticular sheet 804 (and its lenticules 806) more difficult. By concealing the circular lenticular sheet 804 (and its lenticules 806) the circular lenticular optical system 800 is more difficult to reverse engineer.

The foregoing illustrates some of the possibilities for practicing the invention. Many other embodiments are possible within the scope and spirit of the invention. Therefore, it is intended that the foregoing description be regarded as illustrative rather than limiting, and that the scope of the invention is given by the appended claims together with their full range of equivalents.

The invention claimed is:

1. An optical system, comprising:
   a circular image strip comprising an inner image strip and an outer image strip that extend over an effective radial sweep zone; and
   a circular lenticule configured to direct light reflected from the inner image strip to a first eye of a viewer and to direct light reflected from the outer image strip to a second eye of a viewer when the viewer views the effective radial sweep zone of the circular image strip.

2. The optical system according to claim 1, the lenticule further comprising:
   an upper convex surface.

3. The optical system according to claim 1, further comprising:
   a plurality of the circular image strips; and
   a plurality of the circular lenticules;
   wherein the plurality of circular image strips are substantially concentric and adjacent to each other; and
   wherein the plurality of circular lenticules are substantially concentric and adjacent to each other.

4. The optical system according to claim 3, wherein the plurality of circular image strips comprise a circular interlaced image.

5. The optical system according to claim 3, wherein the plurality of circular image strips comprise a circular interlaced image comprising a plurality of angular image frames.

6. The optical system according to claim 5, wherein the angular image frames are configured to carry images that, when viewed in sequence, produce an animation effect.

7. The optical system according to claim 3, further comprising:
   a concealing layer that fills a space between the circular lenticules.

8. The optical system according to claim 1, further comprising:
   a concealing layer comprising a top surface above the circular lenticule.

9. The optical system according to claim 1, further comprising:
   a concealing layer comprising a substantially vertical sidewall adjacent the circular lenticule.

10. The optical system according to claim 1, further comprising a digital disc, wherein the circular image strip and the lenticule are supported by the digital disc.

\* \* \* \* \*